(12) United States Patent
Yen et al.

(10) Patent No.: US 12,630,243 B2
(45) Date of Patent: May 19, 2026

(54) CABLE CONTROL STRUCTURE

(71) Applicant: TIEN HSIN INDUSTRIES CO., LTD., Taichung City (TW)

(72) Inventors: Chia-Hung Yen, Taichung City (TW); Jason Miles, Taichung City (TW)

(73) Assignee: TIEN HSIN INDUSTRIES CO., LTD., Taichung City (TW)

( * ) Notice: Subject to any disclaimer, the term of this patent is extended or adjusted under 35 U.S.C. 154(b) by 765 days.

(21) Appl. No.: 17/993,906

(22) Filed: Nov. 24, 2022

(65) Prior Publication Data

US 2024/0174312 A1    May 30, 2024

(51) Int. Cl.
B62J 1/08 (2006.01)
B62J 11/13 (2020.01)

(52) U.S. Cl.
CPC .................. B62J 1/08 (2013.01); B62J 11/13 (2020.02); *B62J 2001/085* (2013.01)

(58) Field of Classification Search
CPC ......... B62J 1/08; B62J 11/13; B62J 2001/085
See application file for complete search history.

(56) References Cited

U.S. PATENT DOCUMENTS

| | | | | |
|---|---|---|---|---|
| 6,400,145 | B1 * | 6/2002 | Chamings | G01L 5/101 |
| | | | | 24/633 |
| 7,059,592 | B2 * | 6/2006 | Huh | A47C 3/30 |
| | | | | 248/161 |
| 7,422,224 | B2 * | 9/2008 | Sicz | B62J 1/06 |
| | | | | 280/281.1 |
| 8,308,124 | B2 * | 11/2012 | Hsu | B62J 1/08 |
| | | | | 248/161 |
| 9,376,153 | B1 * | 6/2016 | Kuo | B62K 19/36 |
| 9,878,753 | B2 * | 1/2018 | Tsai | B62J 1/08 |
| 9,957,008 | B1 * | 5/2018 | Tsai | B62J 1/08 |
| 2006/0175792 | A1 * | 8/2006 | Sicz | B62J 1/08 |
| | | | | 280/200 |
| 2014/0305253 | A1 * | 10/2014 | Tseng | B62J 1/08 |
| | | | | 74/491 |
| 2015/0024611 | A1 * | 1/2015 | Wilkolaski | H01R 13/6205 |
| | | | | 439/39 |
| 2015/0191208 | A1 * | 7/2015 | Hsu | B62J 1/08 |
| | | | | 403/322.3 |
| 2017/0225731 | A1 * | 8/2017 | Hsu | B62J 1/08 |
| 2023/0099391 | A1 * | 3/2023 | Lawundy | B62J 1/08 |
| | | | | 297/452.2 |

* cited by examiner

Primary Examiner — Valentin Neacsu
Assistant Examiner — Michael R Stabley

(57) ABSTRACT

A cable control structure applicable to a seat tube of a bicycle includes a base, a cable, a magnetic attraction portion and a lever module. The base is arranged in the main body and formed with an open groove corresponding to an adjustment switch. The lever module is arranged in the open groove. The lever module is provided with an actuating portion, a pivoting portion and a cable passing portion. The pivoting portion is positioned between the actuating portion and the cable passing portion and pivoted to the base. The cable is fixed to the cable passing portion. The actuating portion pushes the adjustment switch. The magnetic attraction portion is fixed in the open groove and is adjacent to the cable passing portion. The cable is positioned at the cable passing portion. The cable body passes through the cable passing portion and extends out of the main body.

9 Claims, 6 Drawing Sheets

CABLE CONTROL STRUCTURE

FIELD OF THE INVENTION

The present invention relates to a cable control structure, and more particular to a cable control structure applicable to a seat tube of a bicycle.

BACKGROUND OF THE INVENTION

A bicycle sport has the functions of sightseeing tours and fitness, and the exercise intensity may be adjusted according to the route selection or the types of bicycles. As a result, in recent years, more and more people are engaged in the bicycle sport. With different road conditions, the riding postures applicable to bicycles are also different and may be adjusted according to the heights of saddle positions. For example, relatively high saddle positions are suitable for off-road segments, and relatively low saddle positions are suitable for cornering and downhill diving on road segments.

Telescopic seat tubes can allow riders to adjust the heights of saddle positions directly from switches on handles during riding, without interrupting the riding. In short, the telescopic seat tubes actuate the seat tubes to extend or contract via cables connected between the seat tubes and the switches. In addition, cables of some telescopic seat tubes are arranged in the seat tubes. Such cable installation mode may be referred to as "internal routing", which may prevent the cables from being exposed to affect the appearance of bicycles. However, since workers cannot directly look into seat tubes during cable installation, cables of current telescopic seat tubes are still difficult to install.

SUMMARY OF THE INVENTION

The present invention provides a cable control structure applicable to a seat tube of a bicycle. The cable control structure has the advantage of being easy to install.

A cable control structure applicable to a seat tube of a bicycle is provided. The seat tube includes a main body and an adjustment switch. The adjustment switch is arranged in the main body and is suitable to control extension and contraction of the main body after being pushed. The cable control structure is suitable to push the adjustment switch. The cable control structure includes a base, a cable, a lever module and a magnetic attraction portion. The base is suitable to be arranged in the main body and formed with an open groove. The open groove is formed in correspondence to the adjustment switch. The cable is provided with a cable body and a magnetic attraction piece. The lever module is arranged in the open groove and provided with an actuating portion, a pivoting portion and a cable passing portion. The pivoting portion is pivoted to the base. The cable passing portion is provided for the cable to pass through. The actuating portion is suitable to push the adjustment switch. The magnetic attraction portion is fixed in the open groove and adjacent to the cable passing portion. The cable is positioned at the cable passing portion after the magnetic attraction piece and the magnetic attraction portion attract each other. The cable body passes through the cable passing portion and is suitable to extend out of the main body to be connected to a controller.

In an embodiment of the present invention, the lever module may include a first lever and a second lever. The first lever is provided with the pivoting portion, the cable passing portion and a first pivoting end. The pivoting portion is positioned between the first pivoting end and the cable passing portion, and the first pivoting end is pivoted to the second lever. The second lever is provided with the actuating portion and a second pivoting end, and the second pivoting end is pivoted to the base. A part of the second lever positioned between the actuating portion and the second pivoting end is pivoted to the first lever, and the actuating portion is closer to the pivoting portion than the second pivoting end. The cable is suitable to pull the lever module along a first direction, and the actuating portion is suitable to push the adjustment switch along a second direction opposite to the first direction.

In an embodiment of the present invention, the cable control structure, for example, further includes a pivot shaft. The base has two inner side walls. The two inner side walls are positioned in the open groove and are opposite to each other. The lever module is arranged between the two inner side walls. The second pivoting end is formed with a through groove, and a long side of the through groove extends along the second direction. The pivot shaft is arranged to pass through the through groove and is connected and fixed between the two inner side walls.

In an embodiment of the present invention, the cable passing portion may have a top surface, a bottom surface and a side surface. The top surface is towards the second direction and is opposite to the bottom surface, and the side surface is connected between the top surface and the bottom surface. The top surface is formed with a groove, and the magnetic attraction portion is adjacent to the groove. The cable passing portion is further formed with a cable passing groove communicating with the groove. The cable passing groove penetrates through the top surface and the bottom surface, and a cable placement opening is formed in the side surface. The cable body is suitable to be placed into the cable passing groove via the cable placement opening. The magnetic attraction piece is positioned in the groove after attracting the magnetic attraction portion.

In an embodiment of the present invention, the magnetic attraction portion is, for example, arranged on a side of the cable passing portion opposite to the cable placement opening.

In an embodiment of the present invention, the first lever, for example, further has an axial direction, and the axial direction points to the first pivoting end from the cable passing portion. The cable placement opening has an opening width in the axial direction. A width of the magnetic attraction piece is greater than the opening width, and a cable diameter of the cable body is smaller than the opening width.

In an embodiment of the present invention, the cable passing groove further may have a first section and a second section communicating with each other. The first section is formed with the cable placement opening. The second section extends along the axial direction and is perpendicular to the first section.

In an embodiment of the present invention, the cable control structure further includes a magnetic structure that is arranged on the magnetic attraction piece and corresponds to the magnetic attraction portion. The magnetic attraction piece attracts the magnetic attraction portion via the magnetic structure to be positioned at the cable passing portion.

In an embodiment of the present invention, a material of the magnetic attraction piece includes, for example, a magnetic material.

In an embodiment of the present invention, the base has two inner side walls that are positioned in the open groove and are opposite to each other. The lever module is arranged between the two inner side walls, and one of the two inner side walls is formed with a positioning groove. The magnetic attraction portion is fixed in the open groove.

In an embodiment of the present invention, the magnetic attraction piece includes a head and a magnetic attraction seat. The head is connected to the cable body and the magnetic attraction seat. A material of the magnetic attraction seat includes a magnetic material.

In the cable control structure provided by the present invention, the magnetic attraction piece is combined with the cable and the magnetic attraction portion corresponding to the magnetic attraction piece. Further, the magnetic attraction portion is fixed to the base, so when the cable extends into the base, the magnetic attraction piece and the magnetic attraction portion attract each other, and then the cable is positioned at a position of the base where the cable is to be installed. Based on the above, the cable control structure in the present invention can make it possible to accurately and quickly install the cable to the base without visual observation of an internal structure of the base, so the cable control structure in the present invention has the advantage of being easy to install.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

Figure 1:
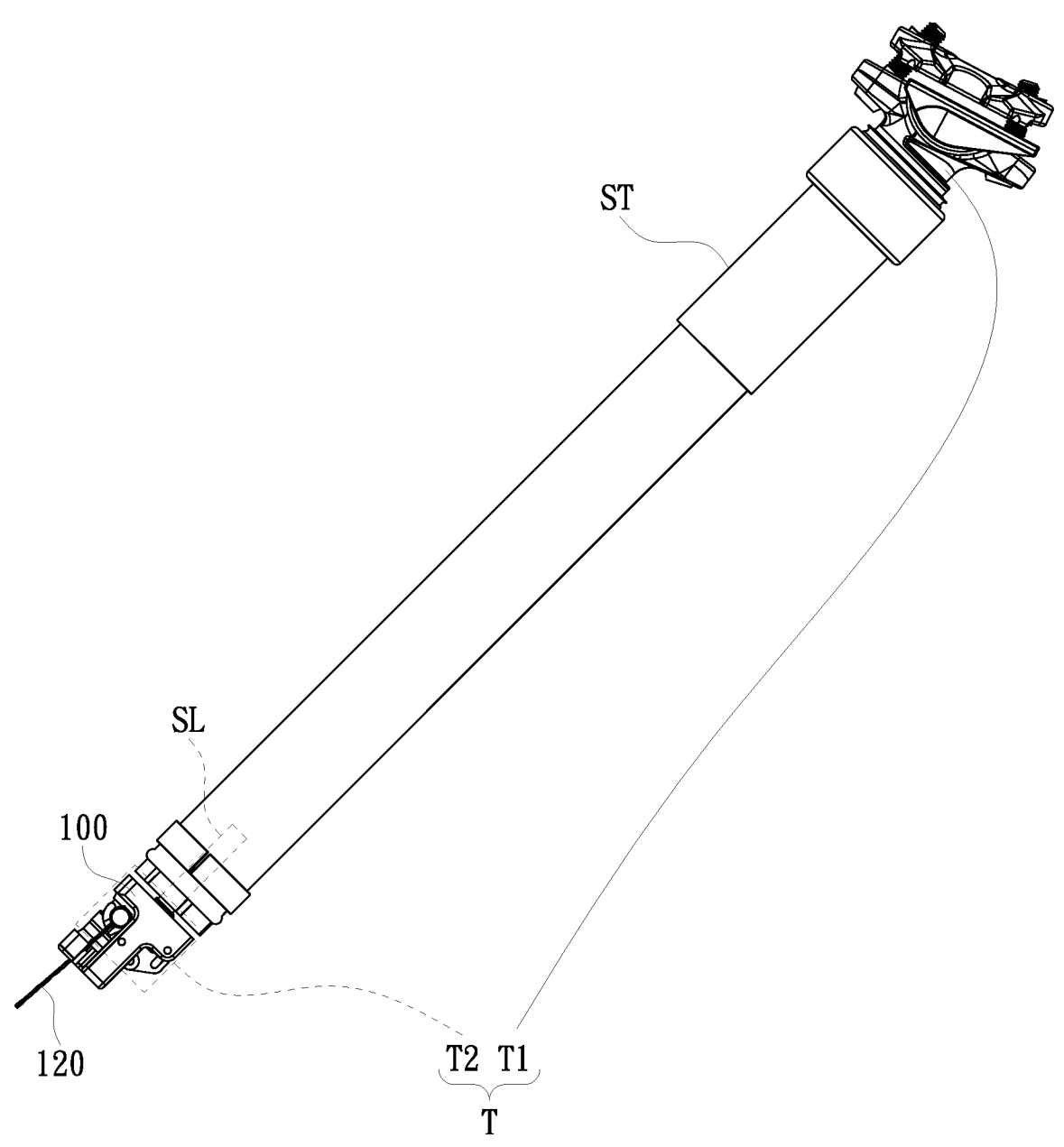
FIG. 1 is a schematic diagram of installing a cable control structure to a seat tube in an embodiment of the present invention.
Figure 2:
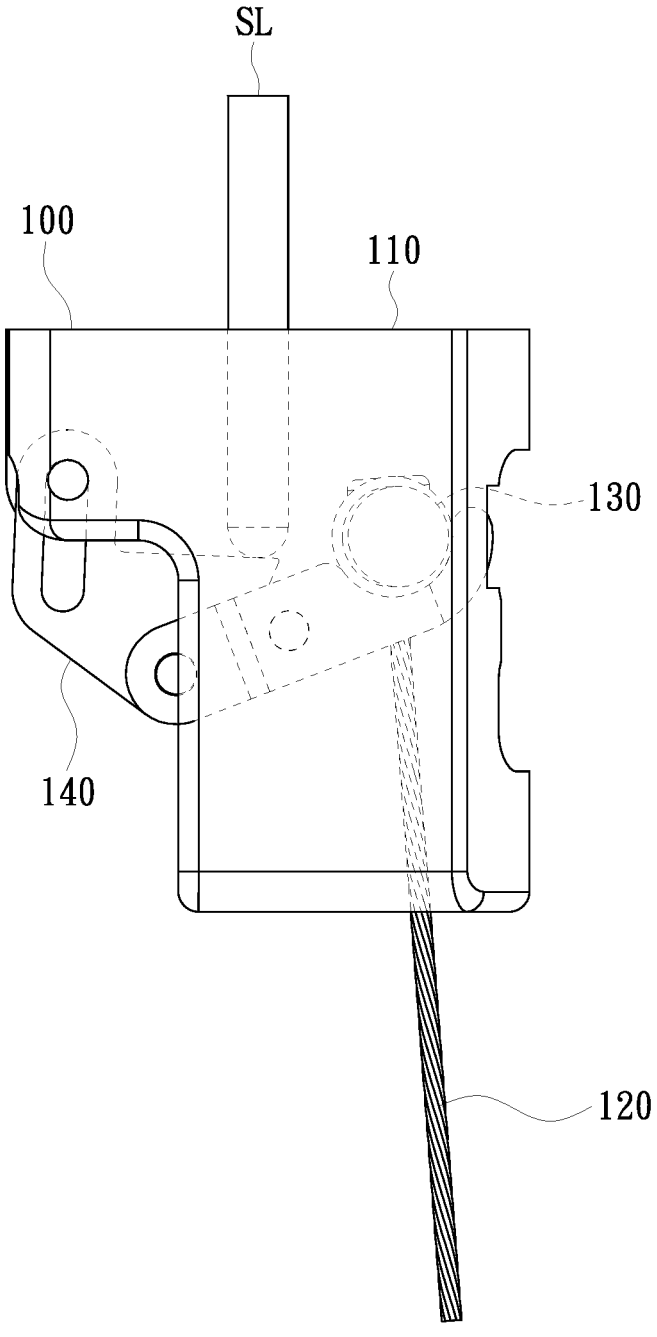
FIG. 2 and FIG. 3 are schematic diagrams of the cable control structure and an adjustment switch in FIG. 1.
Figure 3:
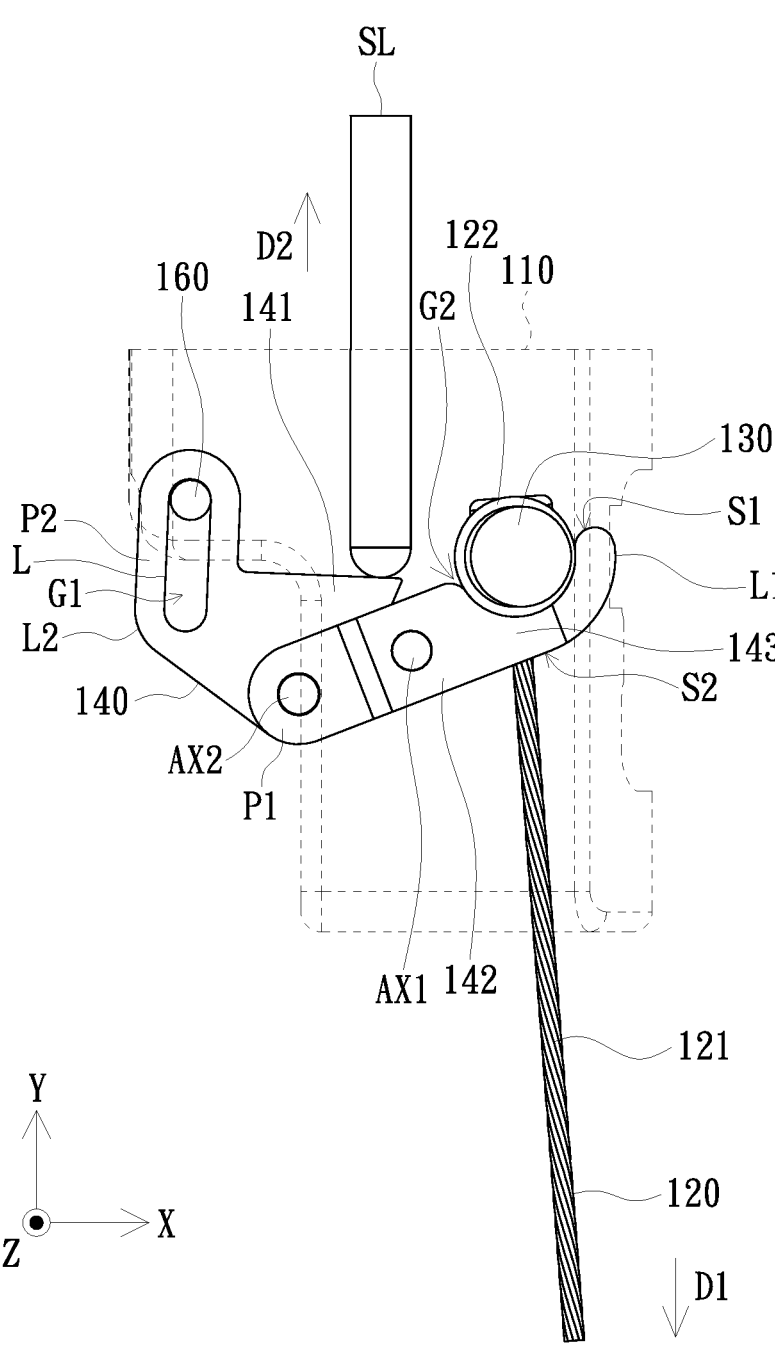
Figure 4:
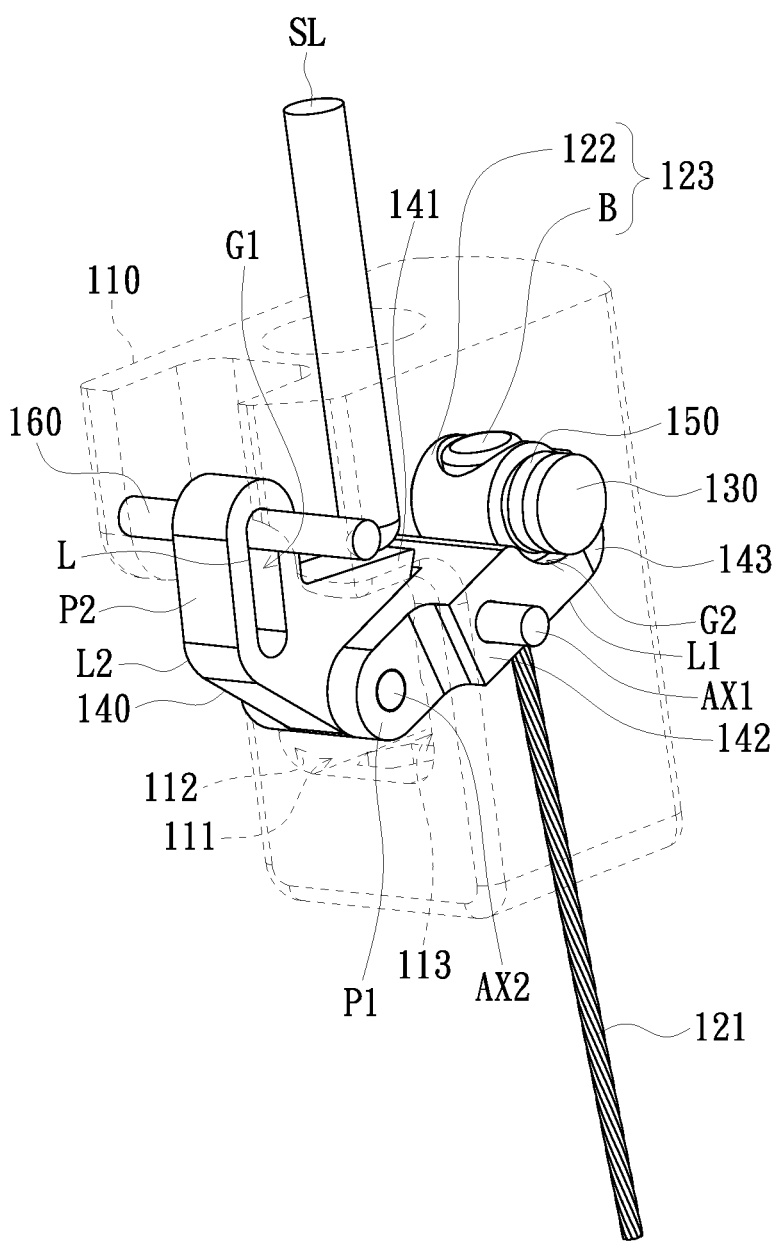
FIG. 4 is a schematic diagram of the cable control structure in FIG. 3 viewed from another viewing angle.

FIG. 1 is a schematic diagram of installing a cable control structure to a seat tube in an embodiment of the present invention. FIG. 2 and FIG. 3 are schematic diagrams of the cable control structure and an adjustment switch in FIG. 1. FIG. 4 is a schematic diagram of the cable control structure in FIG. 3 viewed from another viewing angle. Referring to FIG. 1 first, a cable control structure 100 is applicable to a seat tube ST of a bicycle. The seat tube ST includes a main body T and an adjustment switch SL. The adjustment switch SL is arranged in the main body T and is suitable to control extension and contraction of the main body T after being pushed. The cable control structure 100 is suitable to push the adjustment switch SL. Referring to FIG. 2 and FIG. 3, the cable control structure 100 includes a base 110, a cable 120, a magnetic attraction portion 130 and a lever module 140. The base 110 in FIG. 3 is shown with a dashed line to clearly present the cable 120, the magnetic attraction portion 130 and the lever module 140. Referring to FIG. 3 and FIG. 4 together, the base 110 is suitable to be arranged in the main body T (shown in FIG. 1) and is formed with an open groove 111 (shown in FIG. 4). The open groove 111 is formed in correspondence to the adjustment switch SL. The cable 120 is provided with a cable body 121 and a magnetic attraction piece 123 (marked in FIG. 4) connected with each other. The lever module 140 is arranged in the open groove 111. The lever module 140 is provided with an actuating portion 141, a pivoting portion 142 and a cable passing portion 143. The pivoting portion 142 is positioned between the actuating portion 141 and the cable passing portion 143, and is pivoted to the base 110. The actuating portion 141 is suitable to push the adjustment switch SL. The magnetic attraction portion 130 is fixed in the open groove 111 and is adjacent to the cable passing portion 143. The magnetic attraction piece 123 is formed by combining a head B with a magnetic attraction seat 122. For example, the head B is connected to the cable body 121 and the magnetic attraction seat 122. The magnetic attraction piece 123 is positioned at the cable passing portion 143 after attracting the magnetic attraction portion 130, such that the cable 120 is fixed to the cable passing portion 143 via the magnetic attraction piece 123. The cable body 121 passes through the cable passing portion 143 and is suitable to extend out of the main body T (shown in FIG. 1).

Referring to FIG. 1 again, it should be noted that the main body T includes a telescopic section T1 and a fixing section T2 connected with each other. One end of the telescopic section T1 may be used for installing a saddle position (not shown), and the cable control structure 100 may be fixed in the fixing section T2. A part of the fixing section T2 for fixing the cable control structure 100 in FIG. 1 is shown with a dashed line to clearly present the cable control structure 100. In addition, the fixing section T2 and the cable control structure 100 may be provided with corresponding threads for locking, but a fixing mode is not limited in the present invention.

Figure 5:
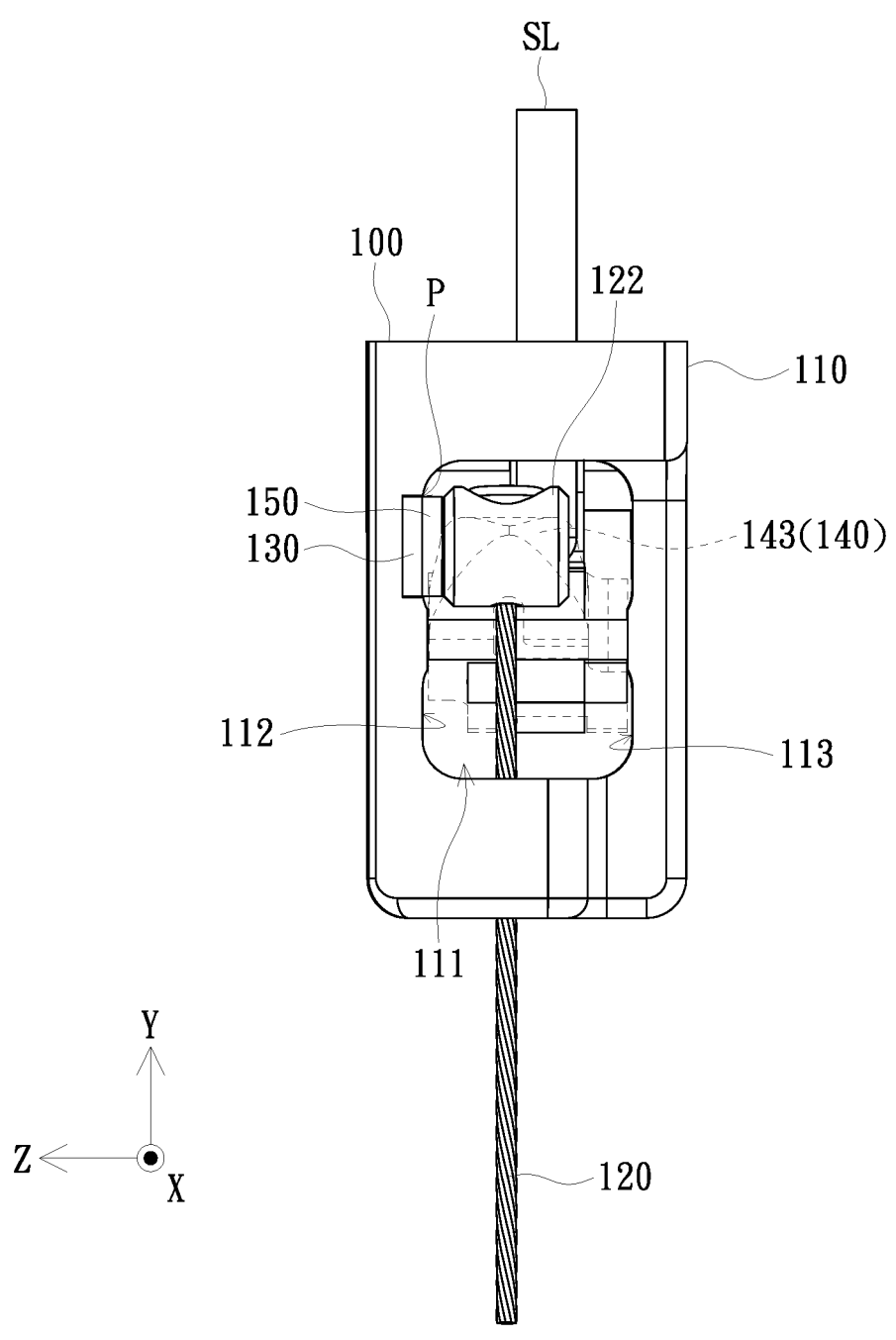
FIG. 5 is a schematic diagram of the cable control structure in FIG. 3 viewed from another viewing angle.

The cable 120 is at least partially arranged in the main body T, and the above-mentioned installation mode may also be referred to as "internal routing". Referring to FIG. 3 and FIG. 4 together, a material of the cable body 121 may include metal. However, the cable body 121 may be integrally formed with the magnetic attraction seat 122 in an embodiment, which is not limited in the present invention. FIG. 5 is a schematic diagram of the cable control structure in FIG. 3 viewed from another viewing angle. FIG. 5 shows a viewing angle relationship with FIG. 3 by directions X, Y and Z, and part of the lever module 140 in FIG. 5 is shown with a dashed line. Referring to FIG. 4 and FIG. 5 together, the cable control structure 100 in this embodiment may further include a magnetic structure 150. The magnetic structure 150 is arranged on the magnetic attraction seat 122 and corresponds to the magnetic attraction portion 130. The magnetic attraction seat 122 attracts the magnetic attraction portion 130 via the magnetic structure 150 to be positioned at the cable passing portion 143. In detail, the magnetic structure 150 has magnetism to serve as a medium for the magnetic attraction seat 122 and the magnetic attraction portion 130 to attract each other; and in this case, the magnetic attraction seat 122 may not have magnetism. However, in another embodiment, a material of the magnetic attraction seat 122 includes, for example, a magnetic material; and in other words, the magnetic attraction seat 122 may be fixed to the magnetic attraction portion 130 by its own magnetism, and at this time the magnetic attraction portion 130 may be a magnet or may also be made of iron or other materials that may be used for the magnetic attraction seat 122 to be positioned in a magnetic attraction manner.

In this embodiment, the magnetic attraction portion 130 is, for example, the magnet. In addition, the shape of the magnetic attraction portion 130 and the shape of the magnetic structure 150 may be disk shapes or plate shapes, and the surfaces of the disk shapes or the plate shapes with relatively large areas may attract each other to enhance magnetic attraction between the magnetic attraction portion 130 and the magnetic structure 150. In this embodiment, the shape of the magnetic attraction portion 130 and the shape of the magnetic structure 150 are shown with the disk shapes, but the present invention is not limited thereto.

A material of the base 110 in this embodiment may be metal, such as aluminum, titanium, stainless steel, or alloy of the aforementioned metal, but in other embodiments, the material of the base 110 may also be a non-metallic material such as plastic and a carbon fiber composite material. Continuing to refer to FIG. 5, in this embodiment, the base 110 may have inner side walls 112 and 113 (also marked in FIG. 4). The inner side walls 112 and 113 are positioned in the open groove 111 and are opposite to each other. The lever module 140 is arranged between the inner side walls 112 and 113, and the inner side wall 112 is formed with a positioning groove P (also shown in FIG. 6). The magnetic attraction portion 130 is fixed in the positioning groove P. Specifically, the positioning groove P may be positioned in a position of the base 110 where the magnetic attraction portion 130 is to be installed, such that the magnetic attraction portion 130 can be easily installed in the correct position during assembly of the cable control structure 100. Incidentally, referring to FIG. 4 and FIG. 5 together, during assembly of the cable control structure 100, the magnetic attraction portion 130 may be fixed in the positioning groove P (shown in FIG. 5) first, then the lever module 140 is arranged in the open groove 111, and finally the cable 120 is positioned in a magnetic attraction manner via the magnetic attraction portion 130 and then is fixed in the cable passing portion 143. However, the specific assembly process is not limited in the present invention.

Referring to FIG. 3 and FIG. 4 together, a material of the lever module 140 in this embodiment may include aluminum, stainless steel, plastic steel, or a polymer composite material such as carbon fibers, but the present invention is not limited thereto. In this embodiment, the lever module 140 may include a first lever L1 and a second lever L2. The first lever L1 is provided with the pivoting portion 142, the cable passing portion 143 and a first pivoting end P1. The pivoting portion 142 is positioned between the first pivoting end P1 and the cable passing portion 143, and the first pivoting end P1 is pivoted to the second lever L2. The second lever L2 is provided with the actuating portion 141 and a second pivoting end P2, and the second pivoting end P2 is pivoted to the base 110. A part of the second lever L2 positioned between the actuating portion 141 and the second pivoting end P2 is pivoted to the first lever L1, and the actuating portion 141 is closer to the pivoting portion 142 than the second pivoting end P2. The cable 120 is suitable to pull the lever module 140 along a first direction D1, and the actuating portion 141 is suitable to push the adjustment switch SL along a second direction D2 opposite to the first direction D1. Further, the cable body 121 of the cable 120 may extend out of the seat tube ST (shown in FIG. 1) along the first direction D1 and is connected to a control module (not shown). The control module can pull the cable body 121 after being actuated to make the cable 120 pull the lever module 140 along the first direction D1. Incidentally, the pivoting portion 142 may include a pivot shaft AX1 arranged on the first lever L1 and the base 110 in a penetration manner. Similarly, another pivot shaft AX2 may be arranged on the first pivoting end P1 of the first lever L1 and the second lever L2 in a penetration manner, such that the first lever L1 and the second lever L2 are pivoted to each other. Incidentally, in this embodiment, the first direction D1 and the second direction D2 may be substantially parallel to the direction Y.

Figure 6:
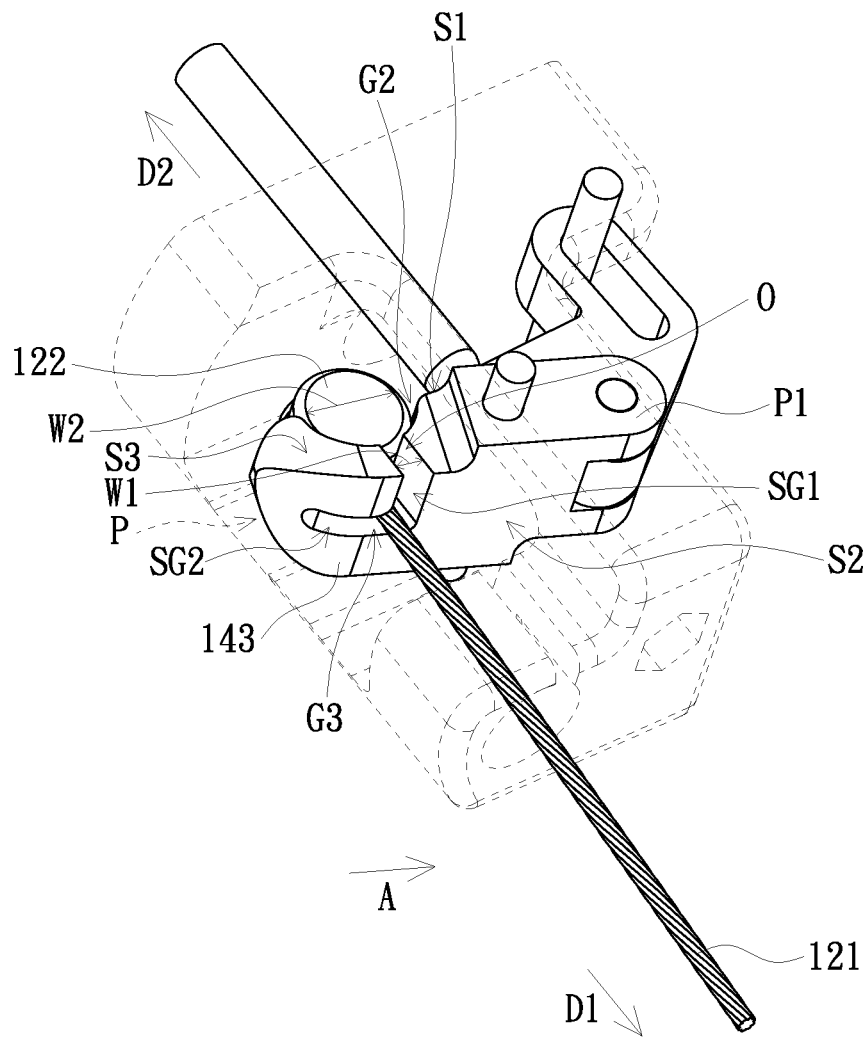
FIG. 6 is a schematic diagram of the cable control structure in FIG. 3 viewed from another viewing angle.

The cable control structure 100, for example, further includes a pivot shaft 160. The second pivoting end P2 is formed with a through groove G1, and a long side of the through groove G1 extends along the second direction D2. The pivot shaft 160 is arranged in the through groove G1 in a penetration manner and is connected and fixed between the inner side walls 112 and 113 (shown in FIG. 4). In this way, when the second lever L2 is actuated by the first lever L1, the through groove G1 can provide space for the second lever L2 to rotate or move. In addition, referring to FIG. 3 and FIG. 6 together, the cable passing portion 143 may have a top surface S1, a bottom surface S2 and a side surface S3 (shown in FIG. 6). The top surface S1 is towards the second direction D2 and is opposite to the bottom surface S2, and the side surface S3 is connected between the top surface S1 and the bottom surface S2. The top surface S1 is formed with a groove G2 (also marked in FIG. 4), and the magnetic attraction portion 130 (shown in FIG. 3) is adjacent to the groove G2. Continuing to refer to FIG. 6, the cable passing portion 143 may be further formed with a cable passing groove G3, where the cable passing groove G3 communicates with the groove G2. The cable passing groove G3 penetrates through the top surface S1 and the bottom surface S2, and a cable placement opening O is formed in the side surface S3. The cable body 121 is suitable to be placed into the cable passing groove G3 via the cable placement opening O. Referring to FIG. 4 and FIG. 6 together, the magnetic attraction seat 122 is suitable to be fixed in the groove G2 after being positioned by attracting the magnetic attraction portion 130 (shown in FIG. 4). Specifically, the magnetic attraction portion 130 is, for example, arranged on a side of the cable passing portion 143 opposite to the cable placement opening O. In detail, during installation of the cable 120, for example, the section of the cable 120 provided with the magnetic attraction seat 122 extends into the main body T (shown in FIG. 1) first, and the magnetic attraction seat 122 will be adsorbed to the magnetic attraction portion 130 by the magnetic attraction when approaching the magnetic attraction portion 130. Furthermore, when the magnetic attraction seat 122 moves toward the magnetic attraction portion 130 by the magnetic attraction, the cable body 121 will enter the cable passing groove G3 via the cable placement opening O, such that the magnetic attraction seat 122 can be closer and fixed to the magnetic attraction portion 130. Based on the above, the magnetic attraction seat 122 can be positioned and fixed in the groove G2 after attracting the magnetic attraction portion 130, and the cable body 121 extends out of the main body T from the cable passing groove G3, such that the installation of the cable 120 is completed. Incidentally, the magnetic attraction seat 122 may be cylindrical in shape, and the shape of the groove G2 may be complementary to the shape of the magnetic attraction seat 122, but these detail features are not limited in the present invention.

Continuing to refer to FIG. 6, in this embodiment, the first lever L1, for example, further has an axial direction A, and the axial direction A points to the first pivoting end P1 from the cable passing portion 143. The cable placement opening O has an opening width W1 in the axial direction A. A width W2 of the magnetic attraction seat 122 is greater than the opening width W1, and a cable diameter of the cable body 121 is smaller than the opening width W1. In this way, the cable body 121 can more easily enter the cable passing groove G3 via the cable placement opening O, and the magnetic attraction seat 122 can be more firmly fixed in the groove G2. According to another aspect, the cable passing groove G3 further may have a first section SG1 and a second section SG2 communicating with each other. The first section SG1 is formed with the cable placement opening O. The second section SG2 extends along the axial direction A and is perpendicular to the first section SG1. In this way, the cable 120 can enter the second section SG2 from the first section SG1, and the second section SG2 can provide space for the cable body 121 to rotate or move relative to the second lever L2 when the cable 120 is pulled along the first direction D1.

In summary, the cable with the magnetic attraction piece, and the magnetic attraction portion corresponding to the magnetic attraction piece are used in the cable control structure provided by the present invention. Further, the magnetic attraction portion is fixed in the base, so when the cable extends into the main body, the magnetic attraction seat will be adsorbed to the magnetic attraction portion, and then the cable is fixed in a position of the main body where the cable is to be installed. Based on the above, the cable control structure in the present invention can make it possible to accurately and quickly install the cable in the main body without visual observation of the interior of the main body, so the cable control structure in the present invention has the advantage of being easy to install.

Finally, it should be noted that the above embodiments are merely intended to illustrate rather than to limit the technical solution of the present invention. Although the present invention has been described in detail with reference to the preferred embodiments, those of ordinary skill in the art should understand that the technical solution of the present invention may be modified or equivalently substituted without departing from the objective and scope of the technical solution of the present invention, which should be covered in the scope of claims of the present invention.

What is claimed is:

1. A cable control structure applicable to a seat tube of a bicycle, the seat tube comprising a main body and an adjustment switch, the adjustment switch being arranged in the main body and being suitable to control extension and contraction of the main body after being pushed, the cable control structure being suitable to push the adjustment switch, the cable control structure comprising:

a base, suitable to be arranged in the main body and formed with an open groove, wherein the open groove is formed in correspondence to the adjustment switch;

a cable, provided with a cable body and a magnetic attraction piece;

a lever module, arranged in the open groove and provided with an actuating portion, a pivoting portion and a cable passing portion, wherein the pivoting portion is pivoted to the base, the cable passing portion is provided for the cable to pass through, and the actuating portion is suitable to push the adjustment switch; and a magnetic attraction portion, fixed in the open groove and adjacent to the cable passing portion, wherein the cable is positioned at the cable passing portion after the magnetic attraction piece and the magnetic attraction portion attract each other, and the cable body passes through the cable passing portion and is suitable to extend out of the main body to be connected to a controller;

wherein the base has two inner side walls, the two inner side walls are positioned in the open groove and are opposite to each other, the lever module is arranged between the two inner side walls, one of the two inner side walls is formed with a positioning groove, and the magnetic attraction portion is fixed in the positioning groove.

2. The cable control structure according to claim 1, wherein the lever module comprises a first lever and a second lever;

the first lever is provided with the pivoting portion, the cable passing portion and a first pivoting end, the pivoting portion is positioned between the first pivoting end and the cable passing portion, and the first pivoting end is pivoted to the second lever;

the second lever is provided with the actuating portion and a second pivoting end, the second pivoting end is pivoted to the base, a part of the second lever positioned between the actuating portion and the second pivoting end is pivoted to the first lever, and the actuating portion is closer to the pivoting portion than the second pivoting end; and the cable is suitable to pull the lever module along a first direction, and the actuating portion is suitable to push the adjustment switch along a second direction opposite to the first direction.

3. The cable control structure according to claim 2, further comprising a pivot shaft, wherein the second pivoting end is formed with a through groove, a long side of the through groove extends along the second direction, and the pivot shaft is arranged to pass through the through groove and is connected and fixed between the two inner side walls.

4. The cable control structure according to claim 2, wherein the cable passing portion has a top surface, a bottom surface and a side surface, the top surface is towards the second direction and is opposite to the bottom surface, the side surface is connected between the top surface and the bottom surface, the top surface is formed with a groove, and the magnetic attraction portion is adjacent to the groove; and the cable passing portion is further formed with a cable passing groove communicating with the groove, the cable passing groove penetrates through the top surface and the bottom surface, a cable placement opening is formed in the side surface, the cable body is suitable to be placed into the cable passing groove via the cable placement opening, and the magnetic attraction piece is positioned in the groove after attracting the magnetic attraction portion.

5. The cable control structure according to claim 4, wherein the first lever further has an axial direction, the axial direction points to the first pivoting end from the cable passing portion, the cable placement opening has an opening width in the axial direction, a width of the magnetic attraction piece is greater than the opening width, and a cable diameter of the cable body is smaller than the opening width.

6. The cable control structure according to claim 4, wherein the cable passing groove further has a first section and a second section communicating with each other, the first section is formed with the cable placement opening, and the second section extends along the axial direction and is perpendicular to the first section.

7. The cable control structure according to claim 1, further comprising a magnetic structure arranged on the magnetic attraction piece and corresponding to the magnetic attraction portion, wherein the magnetic attraction piece attracts the magnetic attraction portion via the magnetic structure to be positioned at a position where the magnetic attraction portion is located.

8. The cable control structure according to claim 1, wherein a material of the magnetic attraction piece comprises a magnetic material.

9. The cable control structure according to claim 1, wherein the magnetic attraction piece comprises a head and a magnetic attraction seat, the head is connected to the cable body and the magnetic attraction seat, and a material of the magnetic attraction seat comprises a magnetic material.

*   *   *   *   *